United States Patent [19]
Takahashi et al.

[11] Patent Number: 5,848,042
[45] Date of Patent: Dec. 8, 1998

[54] RECORDING/REPRODUCING APPARATUS WITH MOVABLE FRONT CONTROL PANEL AND PROJECTION MEMBER COVERING A PORTION OF THE CONTROL PANEL

[75] Inventors: Tsutomu Takahashi, Kanagawa; Shinichi Kojima; Tsuyoshi Ohba, both of Saitama, all of Japan

[73] Assignee: Sony Corporation, Tokyo, Japan

[21] Appl. No.: 772,096

[22] Filed: Dec. 20, 1996

[30] Foreign Application Priority Data

Dec. 28, 1995 [JP] Japan ................................. 7-343810

[51] Int. Cl.⁶ ............................................... G11B 33/02
[52] U.S. Cl. ................................. 369/75.1; 360/137
[58] Field of Search ..................... 369/75.1, 77.1; 360/137, 99.02, 99.06; 455/345

[56] References Cited

U.S. PATENT DOCUMENTS

| | | | |
|---|---|---|---|
| 4,607,301 | 8/1986 | Iizuka | 360/137 |
| 4,623,992 | 11/1986 | Kurosaki et al. | 360/137 |
| 4,630,160 | 12/1986 | Murayama | 360/137 |
| 5,177,730 | 1/1993 | Utsugi | 369/75.1 |

FOREIGN PATENT DOCUMENTS

| | | | |
|---|---|---|---|
| 60-55547 | 3/1985 | Japan | 369/75.1 |
| 62-295291 | 12/1987 | Japan | 369/75.1 |
| 1-282791 | 11/1989 | Japan | 369/75.1 |

*Primary Examiner*—Stuart S. Levy
*Assistant Examiner*—Kevin M. Watkins
*Attorney, Agent, or Firm*—Jay H. Maioli

[57] ABSTRACT

An apparatus for recording and/or reproducing a recording medium, for example, an optical disk, a tape cassette or the like, has an apparatus body having an opening in the front surface side thereof, a front panel and a guard plate. The apparatus body includes therein a recording and/or reproducing unit for recording and/or reproducing the recording medium. The recording medium is inserted into the apparatus body or discharged from the apparatus body through the opening. The front panel is rotatively provided at the front surface side of said apparatus body. The front panel is rotated between a first position for closing the opening and a second position for opening the opening. The guard plate projects to a position for covering a portion of the front panel when the front panel has been rotated from the first position to the second position.

11 Claims, 9 Drawing Sheets

RECORDING/REPRODUCING APPARATUS WITH MOVABLE FRONT CONTROL PANEL AND PROJECTION MEMBER COVERING A PORTION OF THE CONTROL PANEL

BACKGROUND OF THE INVENTION

1. Field of the Invention

The present invention relates to an electronic apparatus and an apparatus for recording and/or reproducing a recording medium, and more particularly to an electronic apparatus and an apparatus for recording and/or reproducing a recording medium having a member movable along the front surface of the body of the apparatus.

2. Background of the Invention

Some recording/reproducing apparatuses, which are electronic apparatuses, have a structure such that an insertion port is formed in the front surface of the body thereof in order to load a recording medium, such as a disk, a tape cassette or the like, and the insertion port is opened/closed by a front panel.

A disk reproducing apparatus, which is a recording and/or reproducing apparatus, having the recording medium insertion port, which is opened/closed by a front panel, has the structure such that a disk insertion port is formed in the front surface of the case of the apparatus and the front panel is moved opposite to the disk insertion port so as to open and close the disk insertion port. By moving the front panel with respect to the disk insertion port such that the top end of the front panel is moved to a position corresponding to the lower end edge of the disk insertion port to thereby open the disk insertion port the disk is inserted into the apparatus or discharged from the same.

In a reproducing apparatus using a tape cassette as a recording medium, a tape cassette insertion port is formed in the front surface of the case of the apparatus and a front panel is moved opposite to the tape cassette insertion port so as to open or close the tape cassette insertion port. By moving the front panel with respect to the tape cassette insertion port such that the top end of the front panel is moved to a position corresponding to the lower end edge of the tape cassette insertion port to open the tape cassette insertion port, the tape cassette is inserted into the apparatus or discharged from the same under the above state.

In the disk or tape cassette reproducing apparatus or the like having the above-mentioned structure, the top end of the front panel faces the lower end edge of the insertion port in a state where the front panel has been moved to open the disk insertion port or the tape cassette insertion port. When the disk, the tape cassette or the like is inserted into the apparatus or discharged from the same under the above state, the lower surface side of the disk, the tape cassette or the like is slid on the top end of the front panel while being in contact with the top end. Therefore, in the case of a disk, the surface of the disk facing the front panel can easily be scratched. Since the surface of the disk which faces the front panel, that is, the lower surface of the disk is generally designed to be a signal reading surface for the information recorded surface, the scratch of the lower surface causes sound to skip and so on unintentionally. Thus, normal reproduction cannot be performed.

In the case of the tape cassette, since its cassette halves are made of relatively hard resin, such as polycarbonate, ABS resin or the like, the tape cassette scratches the portion of the front panel which comes in contact with the tape cassette and thus the contact portion of the front panel is damaged. Thus, there arises a risk that the outer appearance of the front panel deteriorates.

SUMMARY OF THE INVENTION

It is therefore an object of the present invention to provide an electronic apparatus which resolves the above-mentioned problem.

It is another object of the present invention to provide an apparatus for recording and/or reproducing a recording medium which resolves the above-mentioned problem.

According to the present invention, there is provided an electronic apparatus including an apparatus body, a movable member and a projection member. The apparatus body has an opening in the front surface side thereof. The movable member is movably provided in the front surface side of the apparatus body. The movable member is moved between a first position for closing the opening and a second position for opening the opening. The projection member is moved to a position for covering a portion of the movable member when the movable member has been moved from the first position to the second position.

According to the present invention, there is provided an apparatus for recording and/or reproducing a recording medium including an apparatus body, a front panel and a projection member. The apparatus body has an opening in the front surface side thereof. The recording medium is inserted into the apparatus body or the same is discharged from the apparatus body through the opening. The apparatus body accommodates therein a unit for recording and/or reproducing a recording medium. The front panel is rotatably provided at the front surface side of the apparatus body. The front panel is rotated between a first position for closing the opening and a second position for opening the opening. The projection member is projected to a position for covering a portion of the front panel when the front panel has been rotated from the first position to the second position.

DETAILED DESCRIPTION OF THE PREFERRED EMBODIMENTS

An electronic apparatus according to an embodiment of the present invention will now be described in detail with reference to the drawings. A first embodiment will now be described in which the present invention is applied to a disk reproducing apparatus to be mounted on a vehicle and arranged to reproduce a disk type recording medium (hereinafter simply called a "disk"), such as a compact disk.

Referring to FIGS. 1 through 4, a disk reproducing apparatus 1 has an apparatus body 2; a fixed frame 4 secured to the front surface side of the apparatus body 2 and having a disk insertion port 3; a movable frame body 5 for closing and insulating the disk insertion port 3 in a state where the movable frame body 5 is engaged to the fixed frame 4 and opening the disk insertion port 3 when moved downwards from the foregoing closing state; and a front panel 6 detachably attached to the movable frame body 5 and serving as an operation member forming the movable member. The apparatus body 2 includes a conveying mechanism for conveying the disk inserted through the disk insertion port 3 and a reproducing unit for reproducing the disk conveyed by the conveying mechanism.

Figure 1:
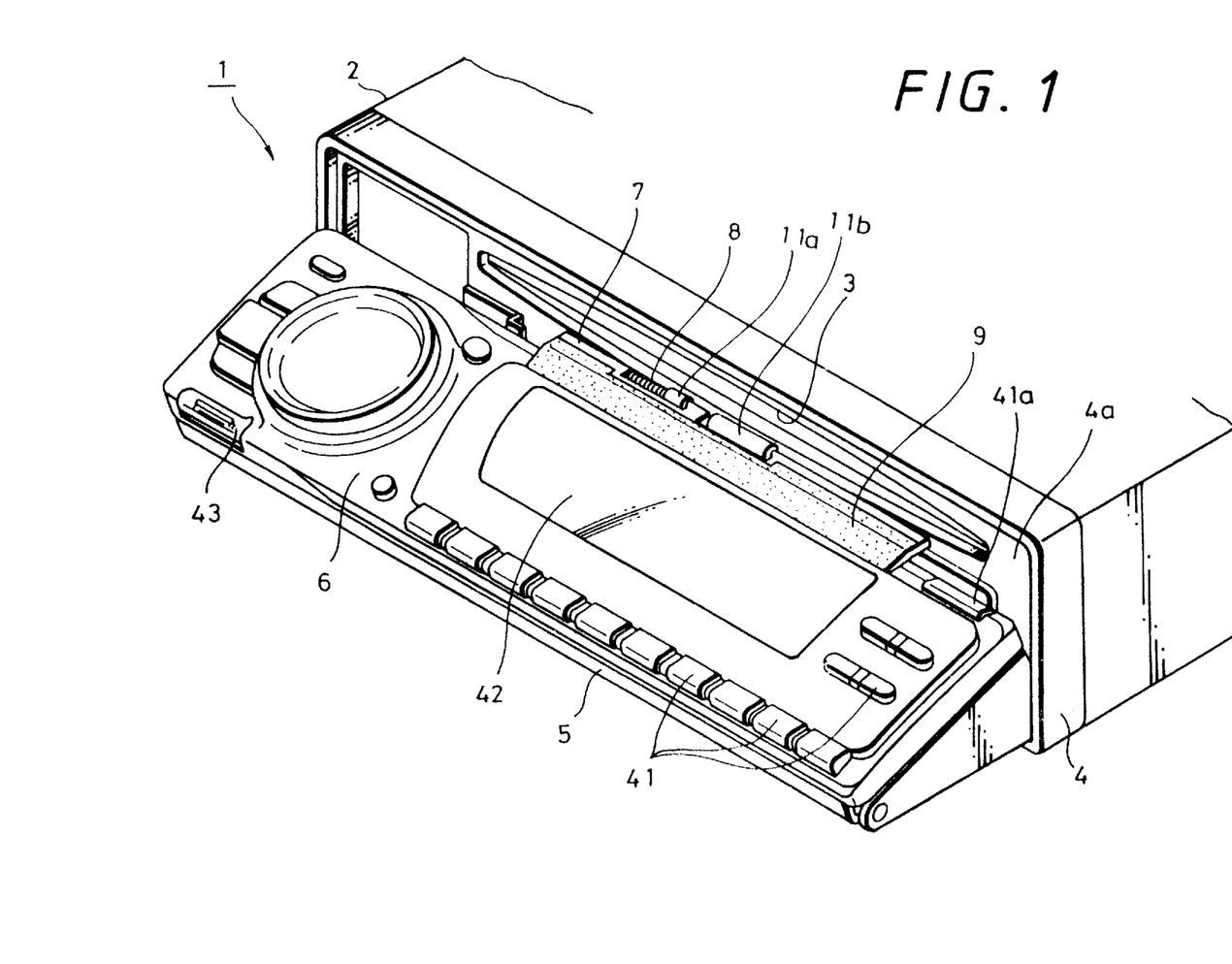
FIG. 1 is a perspective view showing a state of a disk reproducing apparatus according to a first embodiment of the present invention in which a disk insertion port is opened.
Figure 3:
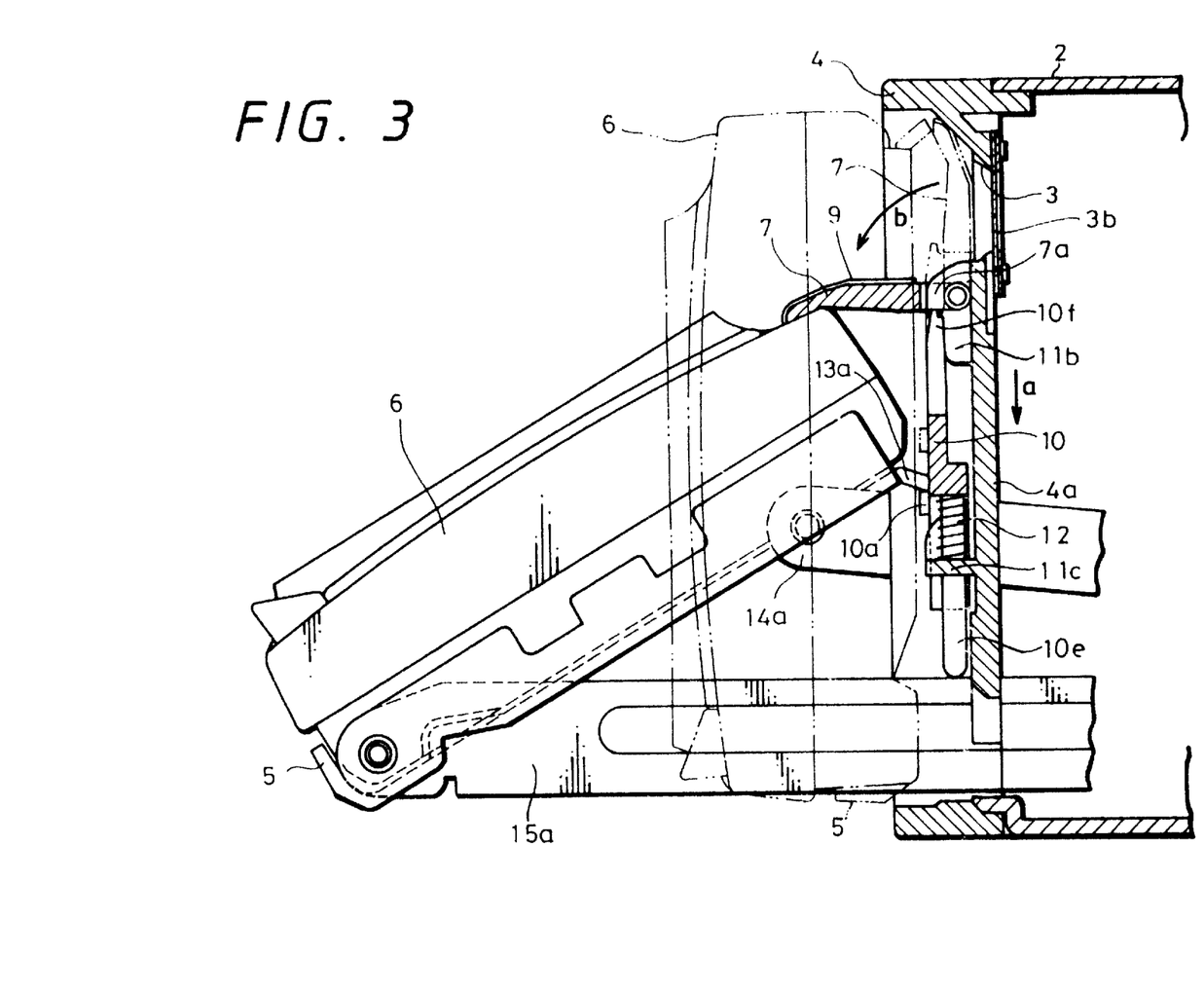
FIG. 3 is an enlarged cross sectional view showing an essential portion for explaining an operation for opening and closing a front panel of the disk reproducing apparatus according to the first embodiment of the present invention.
Figure 4:
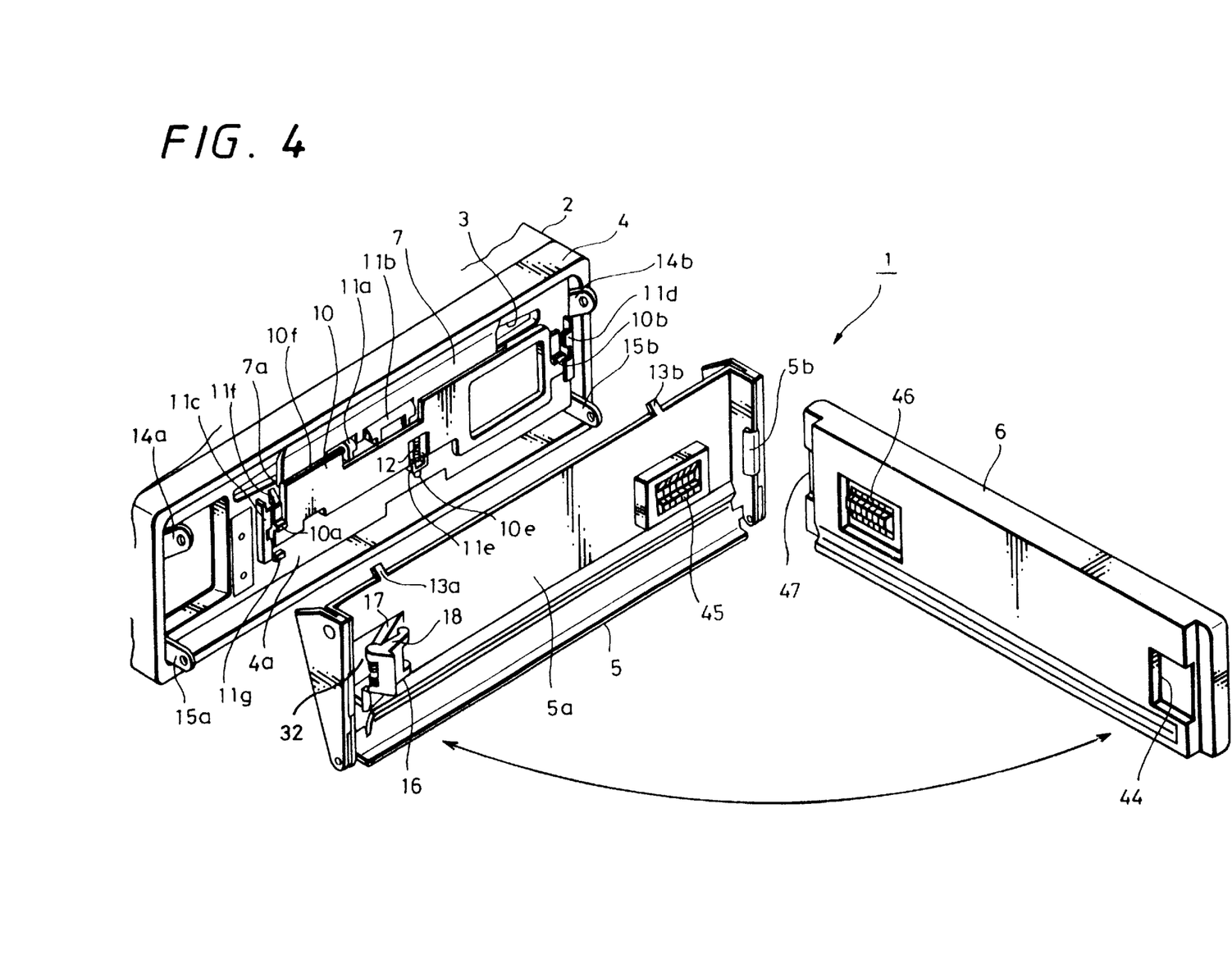
FIG. 4 is an exploded perspective view showing a front surface portion of the disk reproducing apparatus according to the first embodiment of the present invention.
Figure 5:
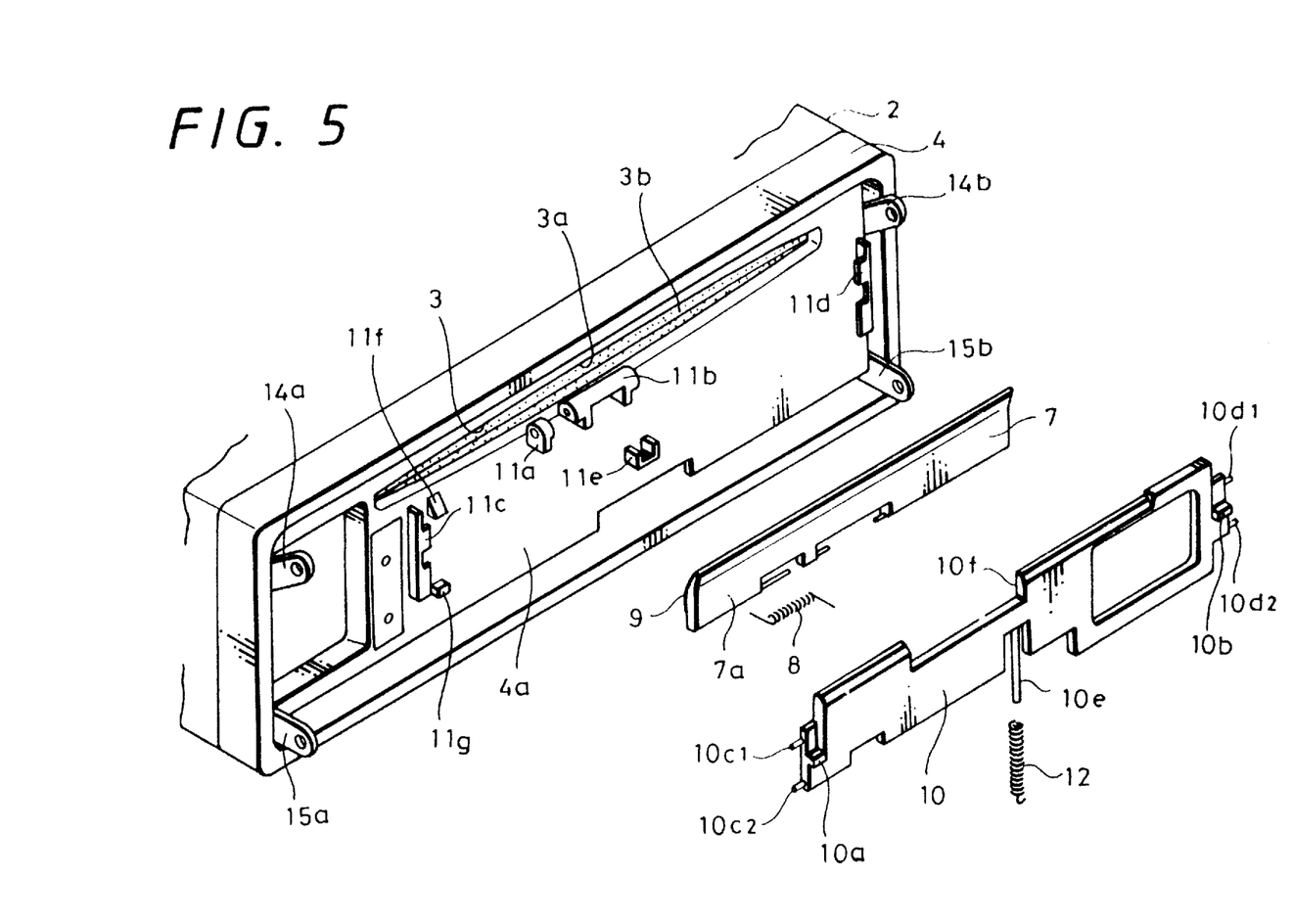
FIG. 5 is an exploded perspective view showing an essential portion of the disk reproducing apparatus according to the first embodiment of the present invention.
Figure 6:
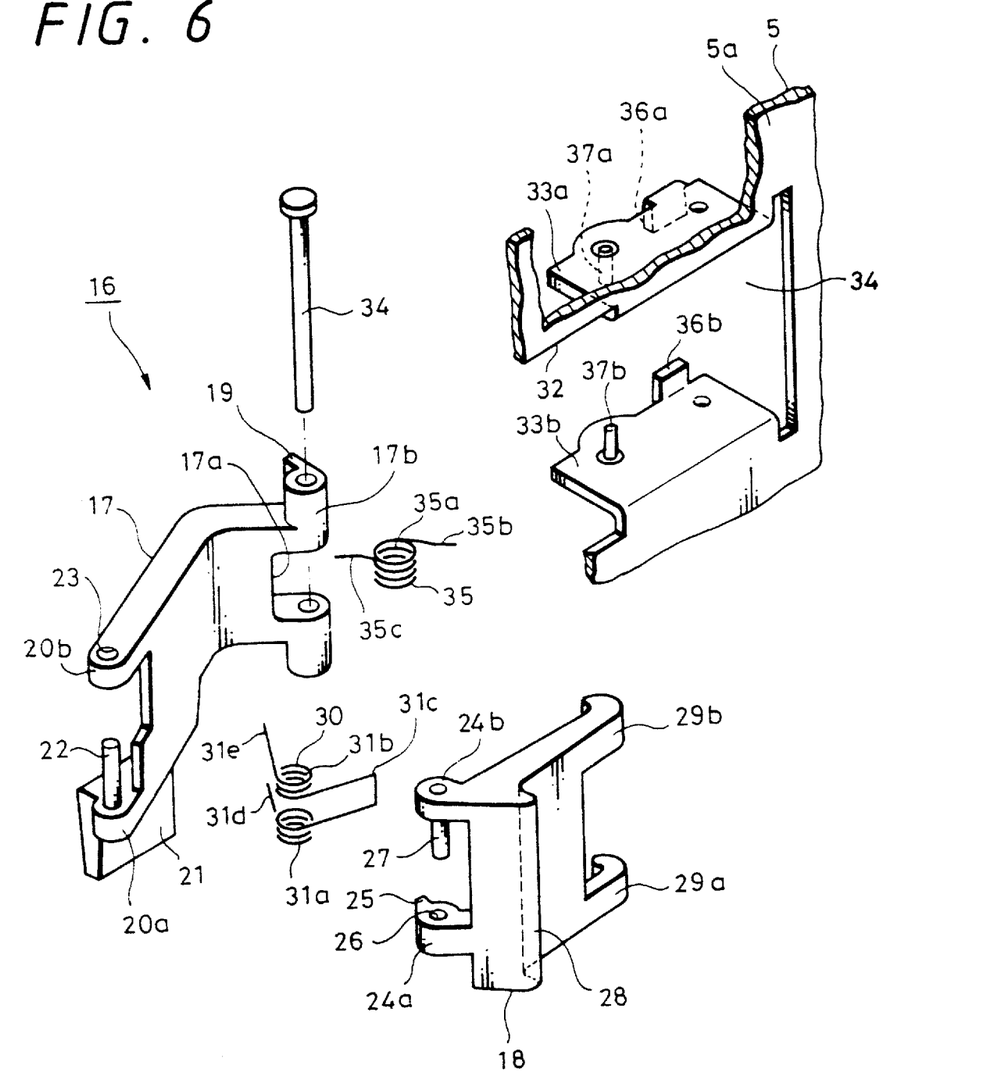
FIG. 6 is an exploded perspective view showing a mechanism for attaching/detaching the front panel for use in the disk reproducing apparatus according to the first embodiment of the present invention.

The fixed frame 4, as shown in FIGS. 4 and 5, is provided with a guide plate 7 to correspond to the disk insertion port 3 formed in the upper half portion of a front surface 4a of the fixed frame 4. The guide plate 7 is disposed to correspond to a central wide (see FIG. 5) of the disk insertion port 3 which has a width larger than the two ends of the disk insertion port 3, the guide plate 7 being permitted to be swingably pivoted to bearings 11a and 11b projecting over the lower end edge side of the disk insertion port 3. The guide plate 7 is, by a coil spring 8, urged to be inclined forwards. The guide plate 7 is, as shown in FIG. 1, made of a material such as a synthetic resin or the like and formed into a plate shape having a width smaller than the width of the disk insertion port 3. As shown in FIG. 3, the leading end side of the surface of the guide plate 7, which becomes the surface when the guide plate 7 has been rotated to a position at which the guide plate 7 cover the upper portion of the front panel 6, is formed into an inclined surface downward in FIG. 3. The inclined surface is followed by a continuous flat portion. The inclined surface of the front panel 6 acts as an introduction portion for facilitating insertion of the disk into the apparatus body through the disk insertion port 3.

When the front panel 6 is positioned at a position at which the front panel 6 covers the disk insertion port 3 as indicated by a two-dot chain line shown in FIG. 3, the guide plate 7 is positioned between the front panel 6 and the front surface side of the apparatus body 2 so that the guide plate 7 covers the central wide portion 3a of the disk insertion port 3, as shown in FIG. 4. When the front panel 6 is at a position indicated by a continuous line shown in FIG. 3, the guide plate 7 is rotated by about 90° until the flat portion of the guide plate 7 is made to be substantially horizontal. On the surface side of the guide plate 7 when the guide plate 7 is inclined, there is bonded a non-woven fabric 9 which is softer than the disk made of synthetic resin and which serves as a protective sheet. Note that a closing curtain 3b made of similar nonwoven fabric is stretched at the inner surface side of the disk insertion port 3.

An operation plate 10 for moving the guide plate 7 up and down is provided to be slidable in the vertical direction below the guide plate 7, that is, in the lower half portion of the front surface 4a of the fixed frame 4.

As shown in FIG. 5, the operation plate 10 has engaging projections 10a and 10b at the two side ends thereof on its surface side to project from the surface of the operation plate 10. Moreover, a pair of support projections 10c1 and 10c2 and another pair of support projections 10d1 and 10d2 in the up and down direction are provided for the two ends of the operation plate 10 to be projected in the lateral direction. In addition, a guide shaft 10e is provided at substantially the central portion of the lower end of the operation plate 10 vertically along the direction in which the operation plate 10 is slid.

The support projections 10c1 and 10c2 and support projections 10d1 and 10d2 provided on the two side ends of the operation plate 10 are engaged to vertical projecting guide portions 11c and 11d formed in the lower half portion of the front surface 4a of the fixed frame 4 to correspond to the lower side positions of the two side ends of the disk insertion port 3. Moreover, the guide shaft 10e is inserted into a projecting receiving portion 11e projectingly formed in the lower portion of the front surface 4a. Thus, the operation plate 10 is supported to be able to slide in the vertical direction. The operation plate 10 is urged to slide upwards by a compressed coil spring 12 penetrating the guide shaft 10e and disposed between the lower end surface of the operation plate 10 and the receiving portion 11e. The compressed coil spring 12 has a spring force stronger than the spring force of the above-said the coil spring 8.

When the operation plate 10 is biased to be slid upwards, the guide plate 7 is, as shown in FIG. 4, rotated and stood erect against the urging force of the coil spring 8 because a lower end 7a on the reverse side of the guide plate 7 is pressed by a top end 10f of the operation plate 10. Note that the vertical slidable range for the operation plate 10 is limited by engaging projections 11f and 11g projecting over the upper and lower portions on the front surface 4a of the fixed frame 4.

The movable frame body 5 having a size corresponding to the front surface 4a is engaged into the fixed frame 4. The movable frame body 5 has, at the top end edge thereof, engaging members 13a and 13b arranged to be engaged to the engaging projections 10a and 10b of the operation plate 10, the engaging members 13a and 13b being bent rearwards. Thus, the movable frame body 5 is supported to be movable with respect to the apparatus body 2. The movable frame body 5 is rotatively supported by rotative support arms 14a and 14b having upper portions of the two side surfaces which are vertically rotatively supported by the apparatus body 2. Moreover, the movable frame body 5 is rotatively supported by slidable support arms 15a and 15b having lower portions of the two side surfaces which are disposed slidable in the forward and rearward directions of the apparatus body 2 and which are, by a drive mechanism (not shown), slidably allowed to appear and retract with respect to the front surface 4a of the fixed frame 4. As shown in FIGS. 1 and 3, the sliding operations of the slidable support arms 15a and 15b in the forward direction cause the movable frame body 5 to be moved downwards in such a manner that the lower portion of the movable frame body 5 is pushed forwards with respect to the front surface 4a of fixed frame 4 so as to be moved to project into a state where the movable frame body 5 is moderately inclined forwards.

The front panel 6 is integrally attached to the movable frame body 5. In the first embodiment, a detaching mechanism 16 for detachably holding the front panel 6 to the movable frame body 5 is provided.

As shown in FIGS. 4 and 6 to 8, the detaching mechanism 16 has an arm 17 rotatively attached to the movable frame body 5 and a holder 18 for holding the front panel 6.

The arm 17 has a bearing portion 17b having a space portion 17a formed into a notch shape at the base portion thereof and a stopper projection 19 projecting rearwards over the bearing portion 17b. The arm 17 has, at the leading end thereof, a pair of projecting support portions 20a and 20b formed apart from each other. A detachment operation portion 21 is integrally formed on the outer surface of the support portion 20a. On the other hand, a shaft column 22 projecting toward the other support portion 20b is formed on the inner surface of the arm 17. A shaft hole 23 is formed in the other support portion 20b to correspond to the axial direction of the shaft column 22.

The holder 18 has, in the base portion thereof, a pair of support portions 24a and 24b projectively formed apart from each other. A stopper projection 25 is provided on the support portion 24a in the direction in which the support portion 24a is extended. Moreover, a shaft hole 26 which is inserted by the shaft column 22 of the arm 17 is formed in the support portion 24a. The other support portion 24b has, on the inner surface thereof, a shaft column 27 which is inserted into the shaft hole 23 of the arm 17, the shaft column 27 being formed in the same direction as the shaft hole 26. The holder 18 has, in the leading end portion thereof, a first engaging portion 28 having an elongated projection shape and formed in the front surface of the holder 18. Moreover, a pair of second engaging portions 29a and 29b each having a hook shape formed rearwards toward the base portion of the holder 18 are formed, the second engaging portions 29a and 29b being formed apart from each other.

The arm 17 and the holder 18 structured as described above are connected to each other at the leading end portion of the arm 17 and the base portion of the holder 18 such that the shaft column 22 of the arm 17 is inserted into the shaft hole 26 of the holder 18; and the shaft column 27 of the holder 18 is inserted into the shaft hole 23 of the arm 17, respectively. Moreover, a first spring member 30 is disposed in the connecting portion of the arm 17 and the holder 18. The first spring member 30 urges the arm 17 and the holder 18 in the direction in which the arm 17 and the holder 18 are moved in the opening direction. Thus, the stopper projection 25 of the holder 18 is brought into contact with the leading end of the arm 17 in the state where the arm 17 and the holder 18 are opened by a predetermined angle and thus the opened state is maintained.

The first spring member 30 comprises a pair of symmetrical torsional coil spring portions 31a and 31b having extension ends connected to each other into a U-shape so as to form a pressing portion 31c. The other extension ends of the torsional coil spring portions 31a and 31b are formed to be other pressing portions 31d and 31e, respectively. The first spring member 30 is disposed between the connected portion of the arm 17 and the holder 18. The torsional coil spring portion 31a is inserted by the shaft column 22 of the arm 17, while the other torsional coil spring portion 31b is inserted by the shaft column 27 of the holder 18. Moreover, the U-shape pressing portion 31c is brought into contact with the front surface of the arm 17, while the pressing portions 31d and 31e are brought into contact with the rear surface of the holder 18 so that the first spring member 30 serves to urge the arm 17 and the holder 18 into the direction in which they are opened.

The detaching mechanism 16 composed of the arm 17, the holder 18 and the first spring member 30 is attached to an end of the movable frame body 5. A window opening 32, into which the detaching mechanism 16 is received and from which the same is allowed to appear, is formed at an end side portion of the front plate portion 5a of the movable frame body 5. Moreover, support members 33a and 33b each having a cut and raised shape are formed on the two vertical edges of the window opening 32 to be projected backwards. The bearing portion 17b of the arm 17 is inserted between the support members 33a and 33b and pivotably supported therebetween by a shaft 34. Moreover, a second spring member 35 having a spring force larger than that of the first spring member 30 is interposed in the bearing portion so that the arm 17 is urged to be forwardly rotated and projected through the window opening 32.

The second spring member 35 is a torsional coil spring having a coil portion 35a which is inserted into the space portion 17a of the bearing portion 17b of the arm 17 and into which the shaft 34 is inserted. One extension end 35b is positioned in contact with the rear surface of the front plate portion 5a of the movable frame body 5, while the other extension end 35c is positioned in contact with the rear surface of the arm 17. Thus, the arm 17 is urged to be rotated forwardly.

Stopper members 36a and 36b each having a bent shape are formed at the rear end edges of the support members 33a and 33b of the movable frame body 5 so that forward rotation of the arm 17 causes the stopper projection 19 to be brought into contact with the stopper members 36a and 36b. Thus, the rotational range of the arm 17 in the forward direction is limited. Moreover, engaging projections 37a and 37b are, at positions apart from the portion in which the arm 17 is supported, formed to project over the inner surfaces of the support members 33a and 33b. Thus, engagement of the second engaging portions 29a and 29b of the holder 18 to the engaging projections 37a and 37b is permitted.

The engagement of the second engaging portions 29a and 29b of the holder 18 to the engaging projections 37a and 37b of the support members 33a and 33b will now be described. The holder 18 is pressed against the urging force of the first spring member 30 to overlap the arm 17. Thus, also the arm 17 is, against the urging force of the second spring member 35, rotated rearwards about the shaft 34 so that the arm 17 is received in the window opening 32 of the front plate portion 5a of the movable frame body 5. In this state, the second engaging portions 29a and 29b of the holder 18 are engaged to the engaging projections 37a and 37b so that the arm 17 and the holder 18 are stacked and received in the window opening 32. As a result, as indicated by a continuous line shown in FIG. 7, the second engaging portions 29a and 29b of the holder 18 are engaged to the engaging projections 37a and 37b of the support members 33a and 33b. Thus, the holder 18 and the arm 17 are held in such a manner that they are accommodated within the height of the support members 33a and 33b.

Figure 7:
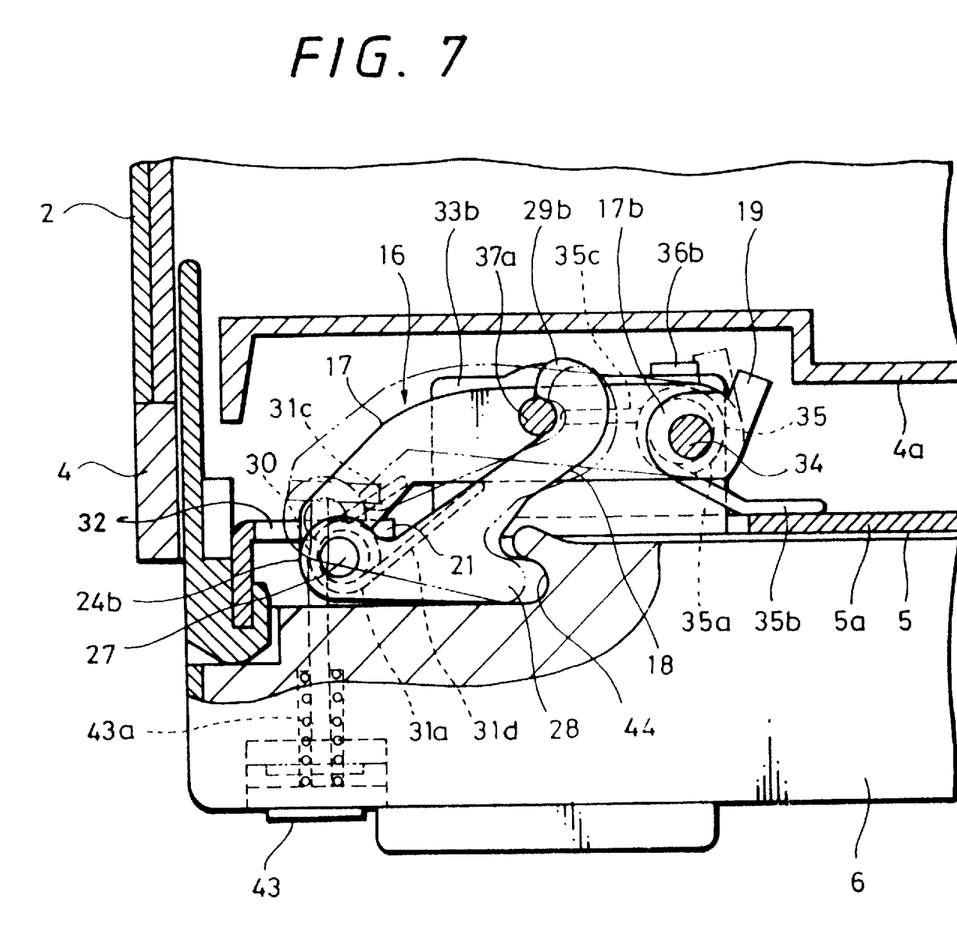
FIG. 7 is a essential part cross sectional view showing a state where the front panel has been attached by the attaching/detaching mechanism.
Figure 8:
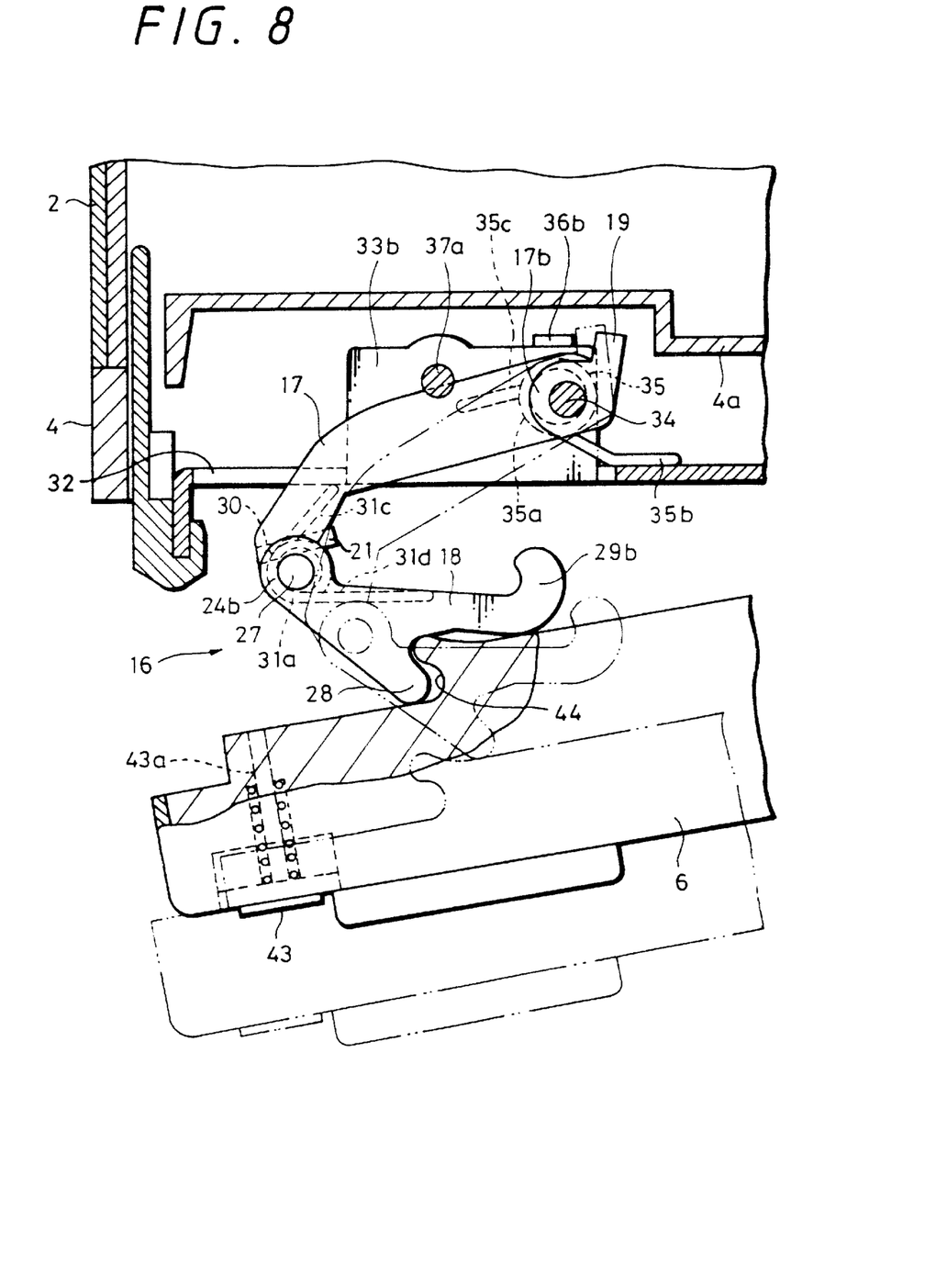
FIG. 8 is a diagram showing a state where the front panel is separated by the attaching/detaching mechanism.

When the detachment operation portion 21 of the arm 17 is pressed in the state shown in FIG. 7 to slightly rotate the arm 17 in the rearward direction, the holder 18 is integrally rotated as indicated by a two-dot chain line. Thus, the second engaging portions 29a and 29b are shifted from the engaging projections 37a and 37b so that engagement is released. As a result, the holder 18 is rotated forwardly with respect to the arm 17 by the urging force of the first spring member 30. Moreover, also the arm 17 is rotated forwardly attributable to the urging force of the first spring member 30 when the pressure, which has been applied to the arm 17, is released. As a result, the arm 17 and the holder 18 project from the window opening 32, as shown in FIG. 8.

Figure 2:
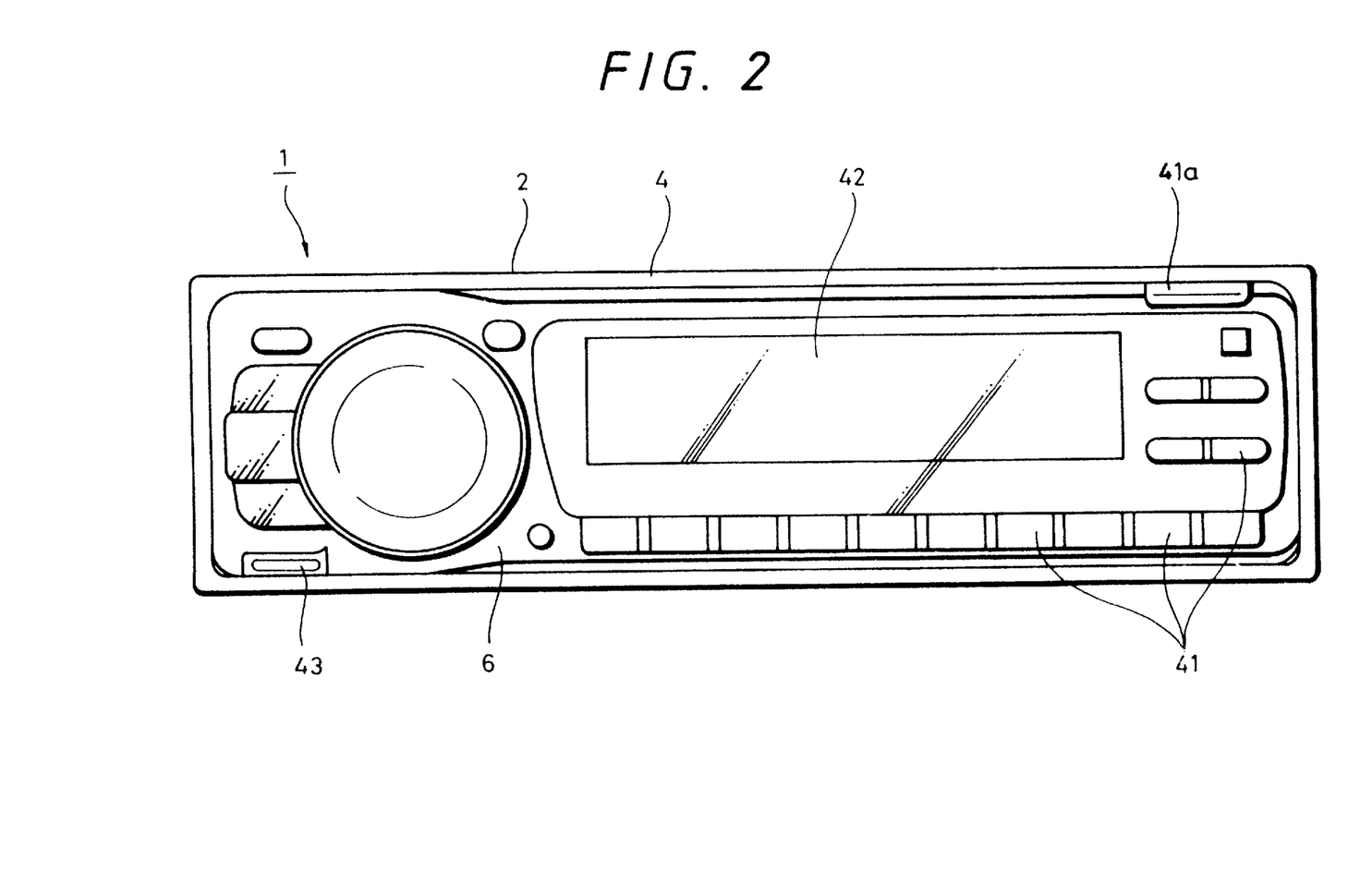
FIG. 2 is a front view showing a state where the disk insertion port of the disk reproducing apparatus shown in FIG. 1 is closed.

The front panel 6 detachably held to the movable frame body 5 by the detaching mechanism 16 having the above-mentioned structure, as shown in FIGS. 1 and 2, has various operation buttons 41 on the front surface thereof to operate the units of the apparatus body 2, a display portion 42 for displaying a state of operation or the like, a release button 43 for separating the front panel 6 from the movable frame body 5 and so on. An engaging recess 44 to be engaged to the first engaging portion 28 of the holder 18 of the detaching mechanism 16 is formed at an end side of the reverse surface of the front panel 6, as shown in FIG. 4. A connection terminal 46 is formed at the other end side of the reverse surface of the front panel 6, the connection terminal 46 being connected to a connection terminal 45 attached to the movable frame body 5 and connected to the apparatus body 2 through a flexible circuit board (not shown). An engaging portion 47 is formed at the other end surface side of the front panel 6, the engaging portion 47 being engaged to a projection 5b on the inner surface of the other end of the movable frame body 5. A pressing pin 43a to be connected to the release button 43 is, as shown in FIG. 7 or FIG. 8, disposed adjacent to the engaging recess 44 to correspond to the detachment operation portion 21 of the arm 17 of the detaching mechanism 16.

The operation for opening/closing the recording medium insertion port, that is, the disk insertion port 3, of the disk reproducing apparatus according to the first embodiment having the above-mentioned structure will now be described.

Initially, the front panel 6 is, integrally with the movable frame body 5, engaged to the fixed frame 4 on the front surface of the apparatus body 2 as indicated by a two-dot chain line shown in FIGS. 2 and 3. In a state where the movable frame body 5 is positioned in parallel to the front surface 4a of the fixed frame 4, the front panel 6 closes the disk insertion port 3 as indicated by the two-dot chain line shown in FIG. 3. Thus, the engaging members 13a and 13b of the movable frame body 5 are positioned at the top end of the front surface 4a of the flixed frame 4 in such a manner that the engaging members 13a and 13b are separated from the operation plate 10 at the front face 4a.

In the above-mentioned state, the operation plate 10 is, by the urging force of the coil spring 12, pressed and slid upwards along the guide portions 11c and 11d through the support projections 10c1, 10c2 and 10d1, 10d2. As a result, the top end 10f is brought into slidable contact with the reverse surface side of the lower end 7a of the guide plate 7. Thus, the guide plate 7 is raised and rotated in such a manner that the guide plate 7 is pushed upwards to face the disk insertion port 3.

When the disk is inserted or discharged from the apparatus body 2 through the disk insertion port 3, an eject operation button 41a of the front panel 6 is operated so that the slidable support arms 15a and 15b are slid forwards by a drive mechanism provided in the apparatus body 2. Therefore, the movable frame body 5 is, together with the front panel 6, moved downwards due to the inclining rotation of the rotative support arms 14a and 14b in such a manner that the lower portion of the movable frame body 5 is pushed forwards. Thus, the movable frame body 5 is projected forwards into a state where the front panel 6 is moderately inclined. Thus, the top surface portion of the front panel 6 engaged to the movable frame body 5 is positioned below the disk insertion port 3, as indicated by the continuous line shown in FIGS. 1 and 2. At this time, the front panel 6 is, as shown in FIG. 1, brought to a state in which the display portion 42 and the various operation buttons 41 are faced upwards, as shown in FIG. 1.

The rotational operation of the movable frame body 5 causes the engaging members 13a and 13b of the top end of the movable frame body 5 to be engaged to the engaging projections 10a and 10b of the operation plate 10 of the front surface 4a of the fixed frame 4.

When the movable frame body 5 is further rotated in the above-mentioned state, the operation plate 10 is, by the engaging members 13a and 13b of the movable frame body 5, moved downwards against the urging force of the coil spring 12 in a direction indicated by an arrow a shown in FIG. 3. As a result, the top end 10f of the operation plate 10 is downwards separated from the lower end 7a of the guide plate 7. Therefore, the guide plate 7 is rotated and thus inclined forwards by the urging force of the coil spring 8 by an angular degree of about 90° in the direction indicated by an arrow b shown in FIG. 3. As a result, the guide plate 7 is brought to a position corresponding to the top surface portion of the front panel 6 so as to cover the same. More specifically, the top surface portion of the front panel 6 corresponding to the central wide portion 3a of the disk insertion port 3 is covered, as shown in FIGS. 1 and 3. In the above-mentioned state, the disk is inserted or ejected with respect to the disk insertion port 3.

As described above, in the first embodiment, the movable frame body 5 holding the engaged front panel 6 is rotated and moved downwards with respect to the front surface 4a of the fixed frame 4 so that the disk insertion port 3 is opened. As a result, the guide plate 7 which is, as shown in FIG. 1, inclined downwards from the lower end portion of the disk insertion port 3 shown in FIG. 4 covers the top surface portion of the front panel 6. Therefore, even if the disk is inserted or ejected in a state where the disk is moved along the lower end edge of the disk insertion port 3, the disk is not brought into direct contact with the front panel 6. As a result, the disk can smoothly be inserted into the disk insertion port 3 or ejected from the same along the surface of the guide plate 7. Since the unwoven fabric 9 is bonded to the surface of the guide plate 7, the lower surface of the disk, from which signals are read, can be protected from being damaged.

As described above, the guide plate 7 is inclined upwards or downwards when the movable frame body 5 is moved vertically and rotated as described above. Since the guide plate 7 is rotated when the operation plate 10 is moved vertically and thus the guide plate 7 is not rotated by the front panel 6 itself, the guide plate 7 does not slide on the top surface of the front panel 6 when the front panel 6 is rotated. Therefore, the top surface portion of the front panel 6 can be protected from being damaged when the guide plate 7 is rotated.

When the movable frame body 5, which is moved vertically and rotated together with the front panel 6, has been moved to the lower position, the operation plate 10 is pressed by the engaging members 13a and 13b through the engaging projections 10a and 10b and thus maintained at the lower position. As a result, the guide plate 7 is, as shown in FIG. 3, maintained to be inclined forwards to cover the upper surface portion of the front panel 6.

When the movable frame body 5 has been moved upwards by a drive mechanism (not shown) from a state indicated by a continuous line shown in FIG. 3, the pressure, which has been applied to the operation plate 10 from the engaging members 13a and 13b,is released. Thus, the urging force of the compression coil spring 12 causes the operation plate 10 to be moved upwards in a direction opposite to the direction indicated by the arrow a shown in FIG. 3. Moreover, the top end 10f pushes upwards the reverse surface side of the lower end 7a of the guide plate 7. As a result, the guide plate 7 is rotated to be erected in a direction opposite to the direction indicated by the arrow b shown in FIG. 3 because the urging force of the coil spring 8 for downwards inclining the guide plate 7 is weaker than that of the coil spring 12.

Since the erecting rotation of the guide plate 7 is realized by the urging force of the coil spring 12, it is performed faster than the upward movement of the movable frame body 5 for closing the disk insertion port 3. Therefore, the upper surface portion of the front panel 6 does not come in contact with the guide plate 7 and thus the guide plate 7 is not pressed. As a result, the guide plate 7 is rotated so as to be erected so that the guide plate 7 is brought into contact with the front surface 4a of the fixed frame 4 in such a manner that the erected guide plate 7 faces the disk insertion port 3. Thus, as indicated by the two-dot chain line shown in FIG. 3, the guide plate 7 is held in such a manner that the top end 10f of the operation plate 10 is superimposed on the reverse surface side of the lower end 7a in the foregoing erected state.

As described above, the erected state of the guide plate 7 can individually be held by the operation plate 10 even in a state where the movable frame body 5 has been moved upwards to correspond to the front surface 4a of the fixed frame 4 and closes the disk insertion port 3. Thus, any play of the guide plate 7 can be prevented.

As described above, when the disk insertion port 3 is opened in such a manner that the movable frame body 5 is moved downwards together with the front panel 6, the engaging members 13a and 13b of the movable frame body 5 are engaged to the engaging projections 10a and 10b of the operation plate 10 at the position adjacent to the lowermost position of the movable frame body 5, for example, in a state immediately before the front panel 6 reaches the position indicated by the continuous line shown in FIG. 3 so that the operation plate 10 is moved downwards. Therefore, the guide plate 7 is rotated so as to be inclined forwards when the movable frame body 5 has been moved downwards, that is, when the front panel 6 has been moved downwards and the operation for opening the disk insertion port 3 has been completed. Therefore, even if the disk insertion port 3 is being opened by the operation of the movable frame body 5, the guide plate 7 does not come into contact with the front panel 6.

In the first embodiment, the detaching mechanism 16 causes the front panel 6 to be detachably held by the movable frame body 5. The attachment and detachment operations will now be described.

FIG. 7 shows a state where the front panel 6 is attached and held by the movable frame body 5. In this state, the first engaging portion 28 of the holder 18 of the detaching mechanism 16 is engaged to the engaging recess 44 of the front panel 6. Moreover, the second engaging portions 29a and 29b are engaged to the engaging projections 37a and 37b projecting over the support members 33a and 33b of the movable frame body 5.

Since the urging force of the second spring member 35 is larger than that of the first spring member 30 under this state, the force acts in this state in such a manner that the engagement between the second engaging portions 29a and 29b of the holder 18 and the engaging projections 37a and 37b of the support members 33a and 33b is maintained. Therefore, the detaching mechanism 16 is locked and thus maintains the front panel 6 in a state where the front panel 6 is attached to the movable frame body 5.

In a case where the front panel 6 is removed from the movable frame body 5 in the foregoing state where the front panel 6 is locked, the release button 43 of the front panel 6 is depressed. Then, the pressing pin 43a connected to the release button 43 is allowed to project over the reverse surface side of the front panel 6 to press the detachment operation portion 21 of the arm 17. As a result, the arm 17 is rotated rearwards against the urging force of the second spring member 35.

As a result, the holder 18 is, as indicated by the two-dot chain dashed line shown in FIG. 7, rotated integrally with the arm 17 so that the second engaging portions 29a and 29b are separated from the engaging projections 37a and 37b of the support members 33a and 33b. When the pressure of the release button 43 is released in the above-mentioned state, the urging force of the second spring member 35 causes the arm 17 to be rotated forwards relative to the shaft 34. Also the holder 18 is rotated forwards relative to the bearing portion of the arm 17 by the urging force of the first spring member 30. That is, the total urging force of the first spring member 30 and the second spring member 35 causes the front panel 6 to be pushed forwards with respect to the movable frame body 5, as shown in FIG. 8.

From the above-mentioned state, the arm 17 is rotated until the stopper projection 19 comes in contact with the stopper members 36a and 36b of the support members 33a and 33b. Also, when the holder 18 is rotated until the stopper projection 25 comes in contact with the arm 17, the front panel 6 is pushed to the frontmost position.

When the front panel 6, which has been pushed to the frontmost position, is held by the hand and pulled strongly and the engaging recess 44 thereof is separated from the first engaging portion 28 of the holder 18, the front panel 6 is completely separated from the movable frame body 5.

When the front panel 6 is attached to the movable frame body 5, the front panel 6 is, as indicated by the two-dot chain line shown in FIG. 8, pushed against the holder 18 of the detaching mechanism 16 which has been rotated and projected forwards with respect to the front plate portion 5a of the movable frame body 5 in such a manner that the inner surface of the engaging recess 44 is pushed against the reverse surface side of the front panel 6. In this state, the front panel 6 is pressed. As a result, the holder 18 is rotated rearwards because the urging force of the first spring member 30 is weaker than that of the second spring member 35 so that the holder 18 faces and comes in contact with the arm 17. When the front panel 6 is further depressed in the above-mentioned state, the arm 17 is, integrally with the holder 18, rotated rearwards against the urging force of the second spring member 35. Thus, the second engaging portions 29a and 29b of the holder 18 are engaged to the engaging projections 37b and 37a of the support members 33b and 33a. Moreover, the first engaging portion 28 is engaged to the engaging recess 44 of the front panel 6. As a result, the front panel 6 is attached to the movable frame body 5, as shown in FIG. 7.

Even in the state where the second engaging portions 29a and 29b of the holder 18 are engaged to the engaging projections 37b and 37a, the front panel 6 can be attached to the movable frame body 5 by inwardly pushing the front panel 6.

By enabling the holder 18 to be engaged to the arm 17 at a larger opening angle, the first engaging portion 28 of the holder 18 can be engaged to the engaging recess 44 of the front panel 6 when the front panel 6 is attached. Therefore, smooth attachment can be performed.

The detaching mechanism 16 having the above-mentioned structure and according to the first embodiment has the arrangement such that the releasing portion for separating the front panel 6 and the pop-up member for discharging the front panel 6 or the like are unified into one member. Therefore, the number of components of the detaching mechanism can be decreased as compared with the conventional mechanism.

Since the detaching mechanism 16 has the structure such that the front panel 6 is attached or detached in accordance with the balance between the first spring member 30 and the second spring member 35, it is effective for use as an audio apparatus for an automobile which has a necessity that the front panel 6 is removed for the purpose of antitheft or the like.

Although the reproducing apparatus according to the first embodiment has the structure such that the movable frame body 5 having the front panel 6 attached thereto is inclined forwards with respect to the front surface of the apparatus body 2 so as to be moved downwards in order to open the disk insertion port 3, the movable frame body 5 may be moved in parallel to the front surface of the apparatus body 2 so as to open the disk insertion port 3.

Although the first embodiment is structured such that the movable member is formed by detachably attaching the front panel 6 to the movable frame body 5, the movable member may be formed by integrating the movable frame body 5 and the front panel 6. The front panel 6 may be a simple plate-like member instead of being made as the operating member.

Figure 9:
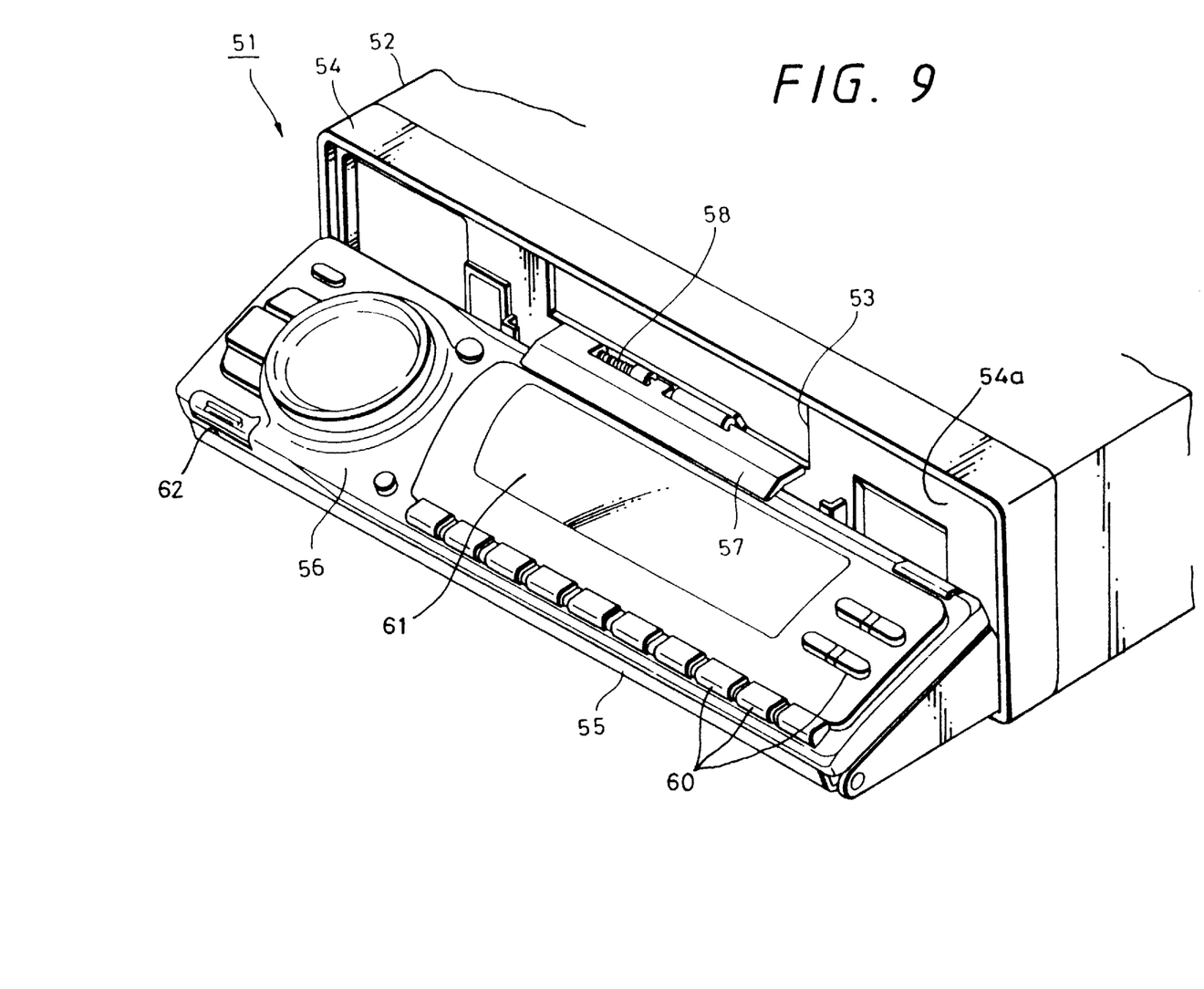
FIG. 9 is a perspective view showing a state where the disk insertion portion of the tape reproducing apparatus according to a second embodiment of the present invention is opened.

Referring to FIG. 9, a tape reproducing apparatus for a vehicle according to a second embodiment of the present invention and arranged to use a tape cassette will now be described. Since the tape reproducing apparatus according to this embodiment is structured similarly to the disk reproducing apparatus according to the first embodiment, only different portions will now be described.

A tape reproducing apparatus 51 arranged to use a tape cassette as the recording medium is formed by a fixed frame 54 fixed to the front surface of an apparatus body 52 and having a cassette insertion port 53; a movable frame body 55 for closing the cassette insertion port 53 when the movable frame body 55 is engaged to the fixed frame 54, and so on moved outwards in order to open the cassette insertion port 53; and a front panel 56 detachably attached to the movable frame body 55.

A guide plate 57 is pivotably attached to the fixed frame 54 at a position below the cassette insertion port 53 of the fixed frame 54 to correspond to the cassette insertion port 53 formed in the upper half portion of a front surface 54a so as to be rotated and inclined. The guide plate 57 is urged by a torsional coil spring 58 so as to be inclined forwards, the guide plate 57 having a width substantially the same as that of the cassette insertion port 53. Similarly to the guide plate 7 according to the first embodiment, the guide plate 57 has an inclined surface at the leading end portion thereof which is the upper surface when the guide plate 57 has been rotated to the position shown in FIG. 9. The inclined surface of the guide plate 57 serves as a guide surface for inserting the tape cassette into the apparatus body 52 through the cassette insertion port 53. The guide plate 57 is made of a synthetic resin and formed into a plate-like shape similarly to that according to the first embodiment. When a movable member formed by attaching the front panel 56 to the movable frame body 55 is moved outwards with respect to the fixed frame 54 on the front surface of the apparatus body 52, that is, moved downwards while being inclined forwards and thus the cassette insertion port 53 being opened, the guide plate 57 is inclined forwards so as to cover a portion of the upper surface of the front panel 56.

When the movable frame body 55 is moved upwards together with the front panel 56 in the state where the guide plate 57 is inclined forwards, the guide plate 57 is erected so as to be held to face the cassette insertion port 53. When the movable frame body 55 has been moved upwards to be coupled to the front surface 54a of the fixed frame 54, the guide plate 57 is closed together with the cassette insertion port 53. In this state, the guide plate 57 is positioned between the front surface of the apparatus body 52 and the reverse surface of the apparatus body 52.

Since the mechanism for downwards or upwards inclining the guide plate 57 when the cassette insertion port 53 is opened or closed by the movable frame body 55 is structured similarly to the mechanism for inclining downwards or upwards the guide plate 7 according to the first embodiment, description and illustration of the mechanism above are omitted here.

The front panel 56 has various operation buttons 60 for operating the units of the apparatus body 52, a display portion 61 for displaying the state of the operation and the like and a release button 62 for separating the front panel 56 from the movable frame body 55.

Also the detaching mechanism for attaching and holding the front panel 56 to the movable frame body 55, a connecting mechanism for connecting the front panel 56 to the apparatus body 52, and an operation and support mechanism for vertically moving the movable frame body 55 with respect to the front surface side of the apparatus body 52 or the like are structured similarly to those according to the first embodiment. Therefore, description and illustration of the similar units are omitted here.

In the tape reproducing apparatus 51 according to the second embodiment and having the above-mentioned structure, the movable member formed by attaching the front panel 56 to the movable frame body 55 is moved outwards with respect to the fixed frame 54 on the front surface of the apparatus body 52, that is, moved downwards while being inclined forwards to open the cassette insertion port 53. In this state, the guide plate 57 is rotated so as to be inclined forwards so as to cover the upper surface portion of the front panel 56 corresponding to the cassette insertion port 53. As a result, insertion and ejection of a tape cassette with respect to the cassette insertion port 53 can be performed along the surface of the guide plate 57. Thus, insertion and ejection of the tape cassette can smoothly be performed. Moreover, the front panel 56 can be protected from damage, such as scratches or the like, by the cassette half.

Since the guide plate 57 is shielded together with the cassette insertion port 53 because the movable frame body 55 is moved upwards and engaged to the fixed frame 54, the guide plate 57 is not observed from the front portion. Thus, the quality of the appearance of the apparatus can be maintained.

Also the second embodiment may be structured such that the movable frame body 55 to which the front panel 56 is attached is moved in parallel to the front surface 54a of the fixed frame 54 to open or close the cassette insertion port 53. As an alternative to this, the movable frame body 55 and the front panel 56 may be integrated to form the movable member.

Although the disk or tape cassette reproducing apparatus has been described in the first and second embodiments as examples of the present invention, the present invention may be applied to a variety of electronic apparatus, such as a stationary or a portable audio apparatus exemplified by a car audio apparatus, a disk player and a cassette player using another recording medium, for example, a recordable disk exemplified by a magnetooptical disk or another recordable disk, and a recording/reproducing apparatus, such as a video tape recorder, a video disk player and an optical disk or the like.

In the foregoing case, the structure, the shape and the like of the components may be modified to be adaptable to the employed apparatus within the scope of the present invention.

Having described the preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An electronic apparatus for use with a recording medium comprising:

an apparatus body having an opening in a front surface side thereof, said opening being for insertion/ejection of the recording medium;

a movable member movably arranged on the front surface side of said apparatus body and forming a control panel for the electronic apparatus, wherein a display portion and a plurality of control switches are included on a front surface of the control panel, said movable member being arranged to pivotally move between a first position for closing said opening and a second position for opening said opening; and a projection member mounted on said apparatus body at said opening and arranged to be pivotally moved to a projection position at which said projection member extends outwardly from said front surface side of said apparatus body and covers a portion of said movable member when said movable member is pivotally moved from said first position to said second position opening said opening; and a movement operation mechanism mounted for sliding movement on said apparatus body and having a first end contacting said movable member and a second end contacting said projection member for causing said projection member to be moved to said projection position when said movable member is moved to said second position, whereby in said projection position said projection member prevents contact between the portion of said movable member and the recording medium during the insertion/ejection thereof.

2. The electronic apparatus according to claim 1, wherein said projection member is moved by said movement operation mechanism between said projection position at which said projection member covers the portion of said movable member when said movable member is moved from said first position to said second position and an accommodation position located between said movable member and said apparatus body when said movable member is positioned at said first position.

3. The electronic apparatus according to claim 2, wherein said projection member includes a rotation support point at a position below said opening in the front surface side of said apparatus body so as to be freely rotatable between said projection position and said accommodation position.

4. The electronic apparatus according to claim 3, wherein a leading end of said projection member comes in contact with an upper end portion of said movable member when said projection member is moved to said projection position and said projection member is substantially horizontal while facing a lower edge of said opening.

5. An apparatus for recording and/or reproducing a recording medium comprising:

an apparatus body having an opening in a front surface side thereof through which the recording medium is inserted into said apparatus body or ejected from said apparatus body;

a front panel rotatively arranged on the front surface side of said apparatus body and forming a control panel for the apparatus for recording and/or reproducing the recording medium, wherein a display and a plurality of control switches are included on a front surface of the control panel, said front panel being arranged to be rotated between a first position at which said front panel closes said opening and a second position at which said front panel opens said opening;

a projection member mounted on said apparatus body at said opening and arranged to be rotated to a projection position at which said projection member extends outwardly from said front side surface of said apparatus body and covers a portion of said front panel when said front panel has been rotated from said first position to said second position opening said opening; and a movement operation mechanism mounted for sliding movement on said apparatus body and having a first end contacting said front panel and a second end contacting said projection member for causing said projection member to move to said projection position when said front panel moves to said second position, whereby in said projection position said projection member prevents contact between said portion of said front panel when the recording medium is inserted into said apparatus body and elected from said apparatus body.

6. The apparatus for recording and/or reproducing a recording medium according to claim 5, wherein said projection member is rotated by said movement operation mechanism between said projection position at which said projection member covers at least a top end portion of said front panel when said front panel has been rotated from said first position to said second position and an accommodation position between said front panel and said front surface side of said apparatus body when said front panel is positioned at said first position.

7. The apparatus for recording and/or reproducing a recording medium according to claim 6, wherein said projection member includes a rotation support point below said opening in the front surface side of said apparatus body so as to be freely rotatable between said projection position and said accommodation position.

8. The apparatus for recording and/or reproducing a recording medium according to claim 7, wherein a lower end portion of said front panel projects from said front surface side of said apparatus body for a distance greater than a projection of an upper end of said front panel when said front panel has been moved from said first position to said second position and a front surface of said front panel faces toward a top surface of said apparatus body.

9. The apparatus for recording and/or reproducing a recording medium according to claim 8, wherein a leading end portion of said projection member comes in contact with a top end portion of said front panel and said projection member is substantially horizontal while facing a lower edge of said opening when said projection member has been moved to said projection position.

10. The apparatus for recording and/or reproducing a recording medium according to claim 5, wherein said projection member is formed by a plate-like member having an inclined surface at a leading end of an upper surface thereof when said projection member is projected to the position at which said projection member covers the portion of said front panel.

11. The apparatus for recording and/or reproducing a recording medium according to claim 5, further comprising a nonwoven fabric portion attached to a surface of said projection member which is the surface thereof that covers the portion of said front panel.

\* \* \* \* \*